(12) United States Patent
Unger

(10) Patent No.: US 9,332,234 B2
(45) Date of Patent: May 3, 2016

(54) TRAIL CAMERA WITH INTERCHANGEABLE HARDWARE MODULES

(71) Applicant: Howard Unger, Henderson, NV (US)

(72) Inventor: Howard Unger, Henderson, NV (US)

(73) Assignee: Duco Technologies, Inc., Henderson, NV (US)

( * ) Notice: Subject to any disclaimer, the term of this patent is extended or adjusted under 35 U.S.C. 154(b) by 205 days.

(21) Appl. No.: 14/101,271

(22) Filed: Dec. 9, 2013

(65) Prior Publication Data

US 2014/0168430 A1 Jun. 19, 2014

Related U.S. Application Data

(60) Provisional application No. 61/735,407, filed on Dec. 10, 2012.

(51) Int. Cl.
*H04N 5/77* (2006.01)
*H04N 7/18* (2006.01)
*H04N 5/225* (2006.01)

(52) U.S. Cl.
CPC ............ *H04N 7/183* (2013.01); *H04N 5/2251* (2013.01)

(58) Field of Classification Search
USPC .............................. 386/358, 362; 348/143, 61
See application file for complete search history.

(56) References Cited

U.S. PATENT DOCUMENTS

| | | | | |
|---|---|---|---|---|
| 7,534,056 | B2 * | 5/2009 | Cross et al. | 396/427 |
| 2003/0209604 | A1 * | 11/2003 | Harrison, Jr. | 235/462.44 |
| 2005/0018073 | A1 * | 1/2005 | Pilu | 348/375 |
| 2005/0207486 | A1 * | 9/2005 | Lee et al. | 375/240.01 |
| 2008/0152339 | A1 * | 6/2008 | Westerweck et al. | 396/541 |

* cited by examiner

*Primary Examiner* — Daquan Zhao
(74) *Attorney, Agent, or Firm* — Lightbulb IP, LLC (57) ABSTRACT

A multipurpose trail camera having expandable and replaceable hardware modules automatically detects and captures one or more images of wildlife in outdoor or other natural environments. The multipurpose trail camera is compatible with various hardware modules that may be attached to its imaging device to provide various functionality. Each hardware module may include various hardware features including image storage, power supply, communication, and image processing capabilities. This allows a user to select one or more hardware modules he or she desires to suit particular needs, a particular environment of use, or the like.

19 Claims, 4 Drawing Sheets

TRAIL CAMERA WITH INTERCHANGEABLE HARDWARE MODULES

CROSS-REFERENCE TO RELATED APPLICATION

This application claims benefit to U.S. Provisional Patent Application No. 61/735,407, titled Trail Camera with Expandable and Replaceable Hardware Features, filed Dec. 10, 2012.

BACKGROUND OF THE INVENTION

1. Field of the Invention

The invention relates to trail and wildlife cameras, and in particular to a trail camera with expandable and replaceable hardware features.

2. Related Art

For nature and wildlife aficionados, capturing a desired image of nature can be difficult. For instance, there may be few vantage points from which a photograph of wildlife can be easily, safely, or conveniently used to capture an image. Sometimes, the best vantage point may be inconvenient or hazardous. For example, nature photographers may not wish to spend extended periods of time in the mountains, desert, or other outdoor environment to capture an image.

Moreover, the object to be captured may move unpredictably. Therefore to capture a desired image of nature a substantial amount of time and patience is often required. This investment in time and effort prevents some photographers from pursuing the images they desire.

From the discussion that follows, it will become apparent that the present invention addresses the deficiencies associated with the prior art while providing numerous additional advantages and benefits not contemplated or possible with prior art constructions.

SUMMARY OF THE INVENTION

A multipurpose trail camera having interchangeable hardware modules is disclosed herein. The multipurpose trail camera is advantageous in that it is quickly and easily configured with particular features/capabilities that a user desires or needs for a particular purpose or particular environment. This provides a cost effective and resource efficient solution to capturing images of wildlife. The various hardware features allow the multipurpose trail camera to automatically detect and capture one or more images of wildlife, as well as to store, process, and share such images as desired by the user or as the environment of use may dictate.

Various embodiments and methods related to the multipurpose trail camera and automatic/unattended capture or wildlife images therewith are disclosed herein. For instance, in one exemplary embodiment, a multipurpose trail camera with interchangeable hardware modules is disclosed, with such multipurpose trail camera comprising an imaging device comprising a camera and one or more sensors configured to detect the presence of wildlife, wherein the image capture device is configured to capture one or more images of the wildlife when the wildlife is detected. A first enclosure of the multipurpose trail camera typically encloses and protects the imaging device. The first enclosure may comprise one or more first attachments, and one or more first interfaces coupled to the imaging device.

One or more hardware modules comprising a power source and one or more communication devices are also included for attachment and connection with the imaging device. The one or more communication devices will typically be configured to receive the one or more images via the one or more first interfaces when the one or more hardware modules are attached to the imaging device, and wirelessly transmit the one or more images to one or more external devices using the one or more communication devices.

One or more second enclosures enclose and protect the one or more hardware modules. The second enclosures will typically comprise one or more second attachments, wherein the one or more first and second attachments are configured to removably attach the imaging device to the one or more hardware modules. The second enclosures typically also include one or more second interfaces coupled to the one or more hardware modules and configured to engage the one or more first interfaces and permit transmission of power and the one or more images between the one or more hardware modules and the imaging device when the imaging device is connected to at least one of the one or more hardware modules.

It is contemplated that the one or more hardware modules may comprise a storage device for storing the one or more images, and an image processor configured to compress the one or more images before they are stored on the storage device. In addition or alternatively, the image processor may compress the one or more images before they are wirelessly transmitted to the one or more external devices.

The first enclosure and the one or more second enclosures may be sealed to prevent moisture from entering and damaging the imaging device and the one or more hardware modules. For example, the one or more first attachments may comprise one or more flanges, and the one or more second attachments comprise one or more channels configured to receive the one or more flanges.

It is noted that the one or more communication devices may be configured to transmit the one or more images to the one or more external devices via a Wi-Fi, Bluetooth, or cellular data connection.

In another exemplary embodiment a multipurpose trail camera with interchangeable hardware modules may comprise an imaging device and a plurality of hardware modules. The imaging device will typically comprise a camera configured to capture one or more images of wildlife, and one or more sensors configured to detect the presence of wildlife, wherein the camera is activated to capture the one or more images when wildlife is detected.

The imaging device will also typically include one or more first interfaces for communicating the one or more images, and a first enclosure configured to hold and protect the camera, one or more sensors, and one or more first interfaces therein. At least a portion of the one or more first interfaces is typically externally accessible at an exterior of the first enclosure for connection with an interface of a hardware module.

The plurality of hardware modules is configured to removably attach to the imaging device. Each of the plurality of hardware modules will typically comprise a power source configured to provide electrical power to the imaging device, and a second interface configured to engage the first interface of the imaging device, wherein the hardware module receives the one or more images via the second interface.

Each hardware module will typically also include an image processor configured to compress the one or more images received via the second interface to generate one or more compressed images, a storage device configured to store the one or more compressed images, and a second enclosure configured to hold and protect the power source, second interface, and wireless communication device therein. At least a portion of the second interface is typically externally accessible and positioned to engage the first interface of the imaging device when the imaging device is attached to the hardware module.

The first enclosure and the second enclosures of the plurality of hardware modules typically comprise corresponding attachments to removably attach the imaging device to any of the plurality of hardware modules. Also, a subset of the plurality of hardware modules also includes a wireless communication device configured to transmit the one or more compressed images to one or more remote devices. This allows a user to choose to use a wireless capable hardware module if wireless communication of images is desired.

It is contemplated that the attachment of the first enclosure may be a flange, while the attachment of second enclosures may be a channel configured to receive the flange. The image processor may be configured to adjust the contrast, brightness, or color of the one or more images before the one or more images are transmitted to the one or more remote devices. In addition or alternatively, the image processor may be configured to control an exposure setting of the camera by communicating through the coupling of the first interface and the second interface when any one of the plurality of imaging devices is attached to the hardware module.

The wireless communication device may transmit the one or more images to the one or more remote devices via a local area network, a wide area network, or the Internet. The power source may comprise a connection for connecting the power source to an electrical utility to receive electrical power therefrom. In addition, the second enclosure may comprise one or more mounts for securing the second enclosure to an outdoor structure.

Various methods are relating to wildlife image capture and the multipurpose trail camera are disclosed herein as well. For instance, in one exemplary embodiment a method for adjusting the features of a multipurpose trail camera is disclosed. Such method may comprise providing a imaging device comprising a camera and one or more sensors, wherein the camera is configured to capture one or more images when the one or more sensors detect the presence of wildlife;

The method also includes providing a first hardware module for attachment to an outdoor structure, the hardware module comprising an interface for receiving the one or more images from the imaging device, and a storage device for storing the one or more images, all contained within a first enclosure, and providing a second hardware module comprising an interface for receiving the one or more images from the imaging device, a storage device for storing the one or more images, and a communication device for transmitting the one or more images to one or more remote devices, all contained within a second enclosure.

The one or more attachments of the first and second enclosures are typically configured to removably secure the imaging device thereto, wherein the imaging device is separated from and attached to the first and second hardware modules as desired by a user.

When attached to the first hardware module, the one or more images from the imaging device are stored by the first hardware module, and when attached to the second hardware module, the one or more images from the imaging device are stored and wirelessly transmitted to the one or more remote devices by the second hardware module.

An image processor may be provided in the first and second hardware modules, wherein the image processor compresses the one or more images before they are stored or transmitted to the one or more remote devices. It is noted that the image processor may alter the brightness, contrast, or color of the one or more images before they are stored or transmitted to the one or more remote devices.

The communication device may be configured to transmit the one or more images wirelessly to the one or more remote devices. Also, the attachment of the imaging device may be a flange while the attachments of the first and second hardware modules may be channels configured to receive the flange. This ensures the imaging device may be attached to the various hardware modules with their respective attachments covering and protecting the interconnection of the interfaces of the imaging device and hardware module to which it is connected.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the trail camera with expandable and replaceable hardware features (hereinafter the "multipurpose trail camera") disclosed herein is configured to provide particular functionality as desired by its various users, as dictated by a particular environment of use, or both. This is highly advantageous in that it permits portions of the multipurpose trail camera to be reused in a variety of environments and for a variety of purposes. In addition, the expandable and replaceable hardware features allow users to configure the multipurpose trail camera for their needs, preferences, or both.

Figure 1A:
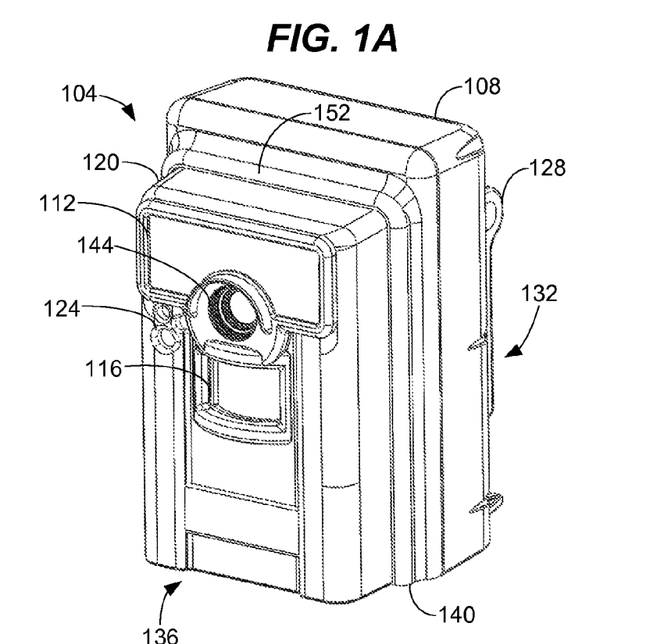
FIG. 1A is a perspective view of an exemplary multipurpose trail camera in an assembled state.

The multipurpose trail camera 104 will now be described with regard to FIGS. 1A-1B. As can be seen, the multipurpose trail camera 104 may comprise an imaging device 120 configured to capture one or more images of nature, such as of wildlife. As shown in FIG. 1A for example, the imaging device 120 of the multipurpose trail camera 104 comprises an image capture device 144 configured to capture images. The image capture device 144 may be a camera or other device for capturing images of nature. It is noted that the image capture device 144 may be configured to capture various ranges of light, such as for low light operation. In addition or alternatively, the image capture device 144 may be configured to capture images in non-visible wavelengths if desired. In this manner, infrared or ultraviolet images can be captured by the multipurpose trail camera 104. The image capture device 144 will typically capture images electronically/digitally, such as with a CCD or similar sensor.

In some embodiments, the image capture device 144 may have a fixed focal length. In other embodiments, the image capture device 144 may be configured to focus on subjects at various distances/locations. As such, it is contemplated that one or more distance sensors 124 may be provided to capture distance information about a subject (i.e., the wildlife to be captured in an image). The image capture device 144 may utilize the distance information to proper focus on the subject thereby ensuring a focused image is captured.

One or more illuminators 112 may be included as well. In general, an illuminator 112 will be configured to project light when an image is captured to illuminate the wildlife being photographed. An illuminator 112 may be configured to project various wavelengths of light. In one or more embodiments, the light generated by an illuminator 112 may be tailored or configured to match the capabilities of the image capture device 144. For instance, an illuminator 112 may generate light that the image capture device 144 is configured to capture (e.g., the illuminator generates visible light for an image capture device configured to capture visible light images).

In operation, the multipurpose trail camera 104 will typically be configured to automatically capture images. For instance, the multipurpose trail camera 104 may have detection functionality to determine whether or not an image should be captured. In this manner, the multipurpose trail camera 104 can detect an object's presence (i.e., the presence of animal(s) or other wildlife) and automatically capture one or more images of the object.

Figure 1B:
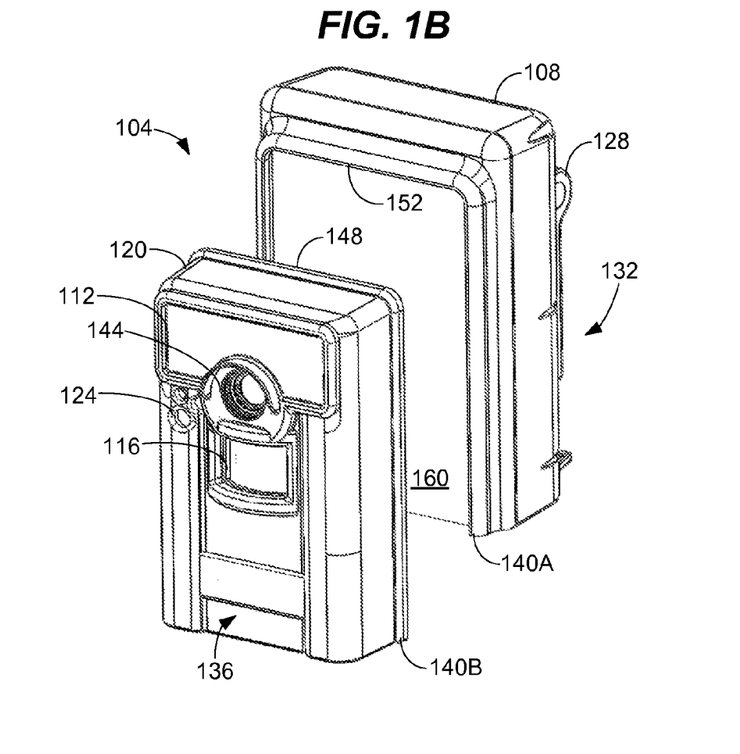
FIG. 1B is a perspective view of an exemplary multipurpose trail camera in an separated state.

As shown in FIGS. 1A-1B for example, the imaging device 120 may comprise one or more sensors 116 for detecting the presence of wildlife. It is contemplated that a sensor 116 may utilize various technologies for detecting wildlife. For instance, a sensor 116 may utilize light, sound, and vibration/movement detection to determine that wildlife is present. In one embodiment, the sensor 116 may emit one or more electromagnetic or sonic signals and determine the presence or absence of wildlife based on the corresponding signals that reflect back to the sensor 116. In another embodiment, the sensor 116 may be a passive device configured only to receive information from the environment. For example, the sensor 116 may be a recording device configured to receive sound, electromagnetic signals, or vibrations/movement from the environment. The presence or absence of wildlife may then be determined with this information.

Typically, upon detection of wildlife via a sensor 116, the multipurpose trail camera 104 will trigger its image capture device 144 to capture at least one image. An illuminator 112, distance sensor 124 or both may also be triggered when capturing an image.

The multipurpose trail camera 104 will typically be configured to operate in outdoor environments. As such, the multipurpose trail camera 104 will typically comprise an enclosure configured to protect the multipurpose trail camera's components from moisture, dirt, debris, and other unwanted items. In addition, the enclosure may be insulated and/or rigid to protect the multipurpose trail camera 104 from physical damage. Also, it is contemplated that the multipurpose trail camera 104 may have a camouflaged appearance or coating/covering so as to blend in with an outdoor environment and to be not readily visible. The enclosure or various portions thereof may be shaped to appear like an object in nature in some embodiments. For instance, the enclosure may be constructed to appear like a portion of a tree, rock, or other natural formation.

Typically, the multipurpose trail camera 104 will be secured to an outdoor structure, such a tree for example. As such, the multipurpose trail camera 104 may include a mount 128 for attaching the multipurpose trail camera 104 to a tree or other natural/outdoor structure. Since the multipurpose trail camera 104 will typically be unattended for periods of time, the mount 128 may be configured to securely mount the multipurpose trail camera 104 and to prevent the multipurpose trail camera from being removed or moved by others.

The expandable and replaceable hardware features of the multipurpose trail camera 104 will now be described with regard to FIG. 1B. As can be seen, the imaging device 120 may be separable from various hardware modules 108. In FIG. 1B, a single module 108 is shown; however it is noted that multiple modules may be attached to one another to form the multipurpose trail camera 104.

In general, a hardware module 108 will add hardware functionality necessary to form an operational multipurpose trail camera 104. For example, a hardware module 108 may provide electrical power to the imaging device 120. In this manner, the imaging device 120 can be made specifically to capture high quality images of wildlife, while individual hardware module(s) 108 are configured to support the imaging device 120. This is advantageous in that it allows a user to utilize the same imaging device 120 for various purposes and in various environments.

In one or more embodiments, the enclosure of the imaging device 120 and one or more modules 108 of the multipurpose trail camera 104 may be configured to physically connect/attach to one another. For instance, as shown in FIG. 1B, the imaging device 120 and hardware module 108 comprise mating attachments 140 configured to engage one another to secure the imaging device to the hardware module, such as shown in FIG. 1A. Typically, the attachments 140 will be configured to secure one or more modules 108 and an imaging device 120 together. In addition, the one or more modules 108 and imaging device 120 may have communication ports; power ports or other interfaces 204 positioned or arranged to automatically align and connect when the one or more modules and imaging device are attached to one another. The interfaces 204 may be configured to carry electrical, optical, or other signals. It is contemplated that the one or more modules and imaging device may communicate wirelessly in some embodiments.

As can be seen from FIGS. 1A-1B, the attachments 140 comprise mating structures that engage one another, allowing the imaging device 120 and hardware module 108 to be both secured to one another but remain removable. This allows various hardware modules 108 to be attached and/or removed to an imaging device 120. In the embodiment of FIGS. 1A-1B, it can be seen that a hardware module 108 may comprise a first attachment 140A in the form of a groove or channel 152 that receives a second attachment 140B in the form of an outwardly extending flange 148 of the imaging device 120.

In one or more embodiments, the attachments 140 may extend around the sides and top but not the bottom of the imaging device 120 and hardware module 108, such as the in the open ended rectangular arrangement of the attachments 140 shown in FIGS. 1A-1B. This allows the hardware module 108 to receive the imaging device 120 at its bottom end, such that the flange 148 of the imaging device 120 is received within the channel 152 at the bottom end of the hardware module 108. The imaging device 120 can then be slid upward until the top end of its flange 148 engages the top end of channel 152, such as shown in FIG. 1A. As can be seen, this secures the imaging device 120 to the hardware module 108.

Figure 1C:
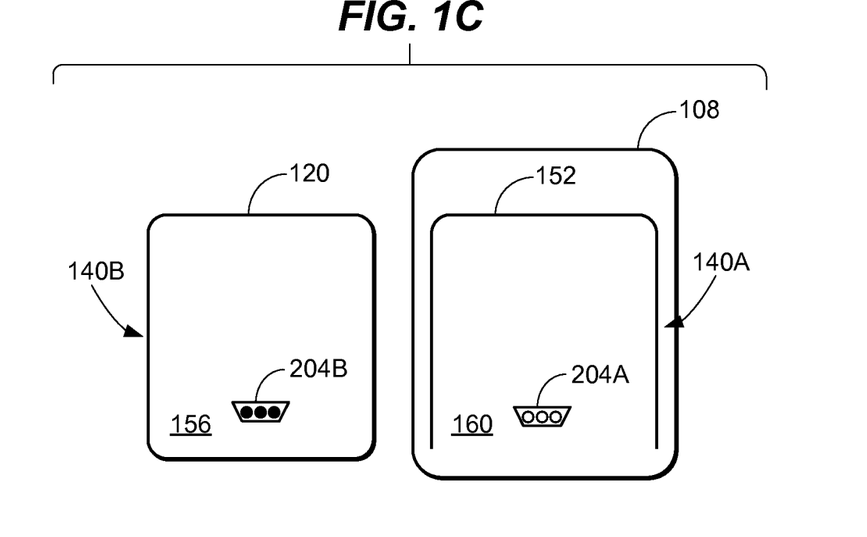
FIG. 1C is a back view of an exemplary imaging device and hardware module in an separated state.

As will be detailed further below communication and/or power interfaces 204 would be aligned (i.e., connected) thus allowing power and data (e.g., images) to be shared between the imaging device 120 and hardware module 108 once they are attached/secured together. FIG. 1C provides a back view of an imaging device 120 and hardware module 108 illustrating exemplary interfaces 204. As can be seen, the interfaces 204 may be externally accessible on the mating surfaces of the imaging device 120 and hardware module 108. In FIG. 1C for instance a first interface 204A of the hardware module 108 is accessible at a front mating surface 160 of the hardware module, while a second interface 204B is accessible at a back mating surface 156 of the imaging device 120. The interfaces 204 will be positioned such that they align to connect or couple with one another when the imaging device 120 and hardware module 108 are attached to one another. It is noted that the electrical, optical or other terminals/connectors of at least one of the interfaces 204 may be biased outward so as to ensure contact with the terminals/connectors of a mating interface.

The attachments 104 (i.e., the channel 152 and flange 148) may form a seal when coupled together so as to prevent moisture, dirt, debris or other unwanted items from infiltrating the multipurpose trail camera 104 after assembly. As shown in FIG. 1A for example, the attachments 140 are each shaped to extend around the periphery of the imaging device 120 forming a seal when the attachments engage one another. This protects the interface/connection between the imaging device 120 and one or more hardware modules 108 to permit uninterrupted transfer of data and/or power.

As can also be seen, the attachment 140 may be angled, shaped or otherwise arranged to direct moisture, dirt, debris and other unwanted items away from the multipurpose trail camera 104. In this manner, rain or dirt would flow off the multipurpose trail camera 104 to prevent such items from damaging or hindering operation of the multipurpose trail camera. For example, as can be seen in FIGS. 1A-1B, the channel 152 overlaps the imaging device's enclosure and flange 148 at the imaging device's top and sides. The channel 152 therefore operates like a shingle in that any rain (or other moisture), dirt, debris and other undesired objects would flow around the channel 152 and imaging device 120 to subsequently drop from the sides of the multipurpose trail camera 104.

It is noted that once assembled, the various hardware module(s) 108 and imaging device 120 of the multipurpose trail camera 104 may be further secured by one or more fasteners. Some exemplary fasteners include screws, pins, clamping devices and the like. Typically, these fasteners will be removable to allow the module(s) 108 and imaging device 120 to be separated thereafter. In alternative embodiment, the imaging device 120 and hardware modules 108 may be removably attached only with fasteners.

Typically, a hardware module 108 will be contained within its own enclosure, such as shown in FIG. 1B. This is advantageous in that this enclosure is configured to enclose and protect the particular hardware module 108. As alluded to above, the enclosure may be watertight, rigid, and/or sealed to prevent infiltration of unwanted moisture, dirt, debris or other items. Likewise, the imaging device 120 may be contained within its own enclosure to enclose and protect the imaging device.

An imaging device 120 and one or more hardware modules 108 may be attached at various locations. As shown in FIGS. 1A-1B for example, the imaging device 120 is secured to a front end 136 of the multipurpose trail camera 104, while the hardware module 108 is at a back end 132 of the multipurpose trail camera. This allows the image capture device 144, sensor 116, illuminator 112 and/or other components to be outward facing at the front end 136 of the multipurpose trail camera 104. In one or more embodiments, the multipurpose trail camera 104 may be configured such that hardware module(s) 108 attach at a back end 132 of the multipurpose trail camera or at other locations so as to not obstruct the image capture device 144, sensor 116, illuminator 112 and/or other components of the imaging device 120.

Figure 2A:
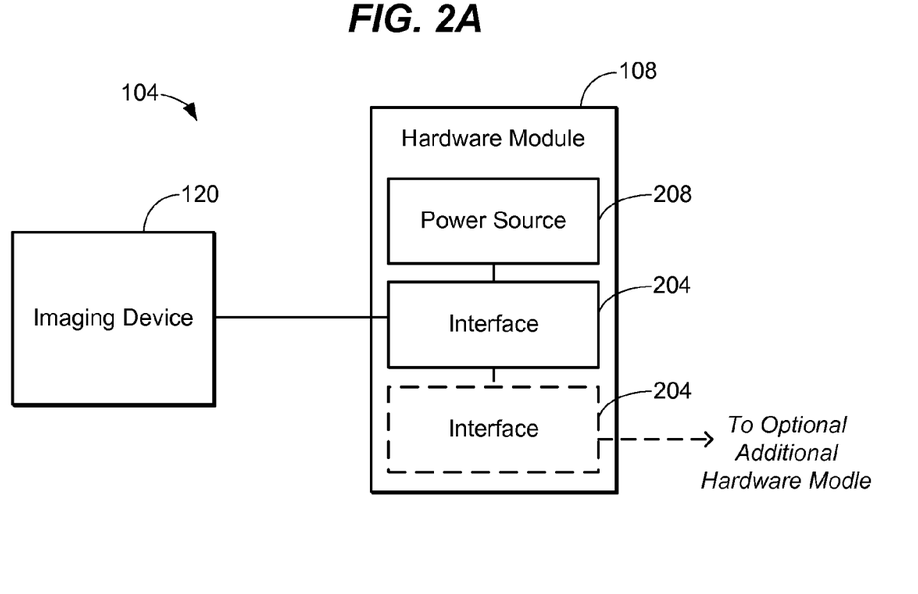
FIG. 2A is a block diagram illustrating an exemplary hardware module having a power source.

Various hardware modules 108 will now be described with regard to FIGS. 2A-2D. As can be seen, a hardware module 108 may comprise one or more interfaces 204 such as for receipt and/or transmission of power or communication signals. As stated above, the interfaces 204 may be configured to couple to an interface of the imaging device 120 and/or another module 108. It is contemplated that the interfaces of multiple modules 108 and an imaging device 120 may form a daisy chain for transmission of power and/or communications between these components of the multipurpose trail camera. In one or more embodiments, multiple interfaces 204 may be provided in a hardware module 108 or imaging device 120 with each interface being configured to connect to a single hardware module or imaging device. To illustrate, FIG. 2A shows an optional additional interface 204 in dashed lines.

As will now be described a hardware module 108 may provide one or more hardware features. In general, the imaging device 120 will be inoperable without at least one hardware module 108. For example, as shown in FIG. 2A, a hardware module 108 having a power source 208, such as a battery, is provided to provide electrical power to the imaging device 120. It is contemplated that such a hardware module 108 may have various capacities. For instance, hardware modules 108 with batteries of various capacities may be provided. In this manner, a user may select the desired battery capacity for his or her purposes. For example, a larger battery may be selected when the multipurpose trail camera is used at a remote or difficult to access location to allow for unattended operation for an extended period of time.

It is noted that one or more power sources 208 may be included. In general, the power sources 208 will be portable; however it is contemplated that the multipurpose trail camera may be powered by an external power source via one or more attached electrical conduits for example. Also, in addition to or instead of a battery, a fuel cell, generator, solar panel or other power source may be included in the hardware module 108. As can be seen, some power sources 208 may extend the time the multipurpose trail camera can operate almost indefinitely if desired. For instance, a solar panel may be used to recharge or power the multipurpose trail camera in some embodiments. In situations where the user will return to the multipurpose trail camera relatively often, a power source of smaller capacity can be used. This saves on cost and resources both for the user and the manufacturer of the multipurpose trail camera, while also providing a multipurpose trail camera that is well suited for the purposes of various users.

Figure 2B:
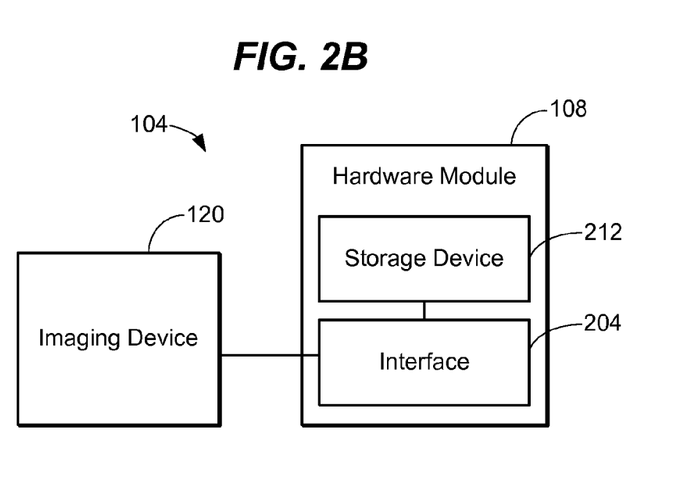
FIG. 2B is a block diagram illustrating an exemplary hardware module having a storage device.

The hardware module 108 of FIG. 2B shows other hardware features that may be provided by a module. As can be seen, a hardware module 108 may include components for storing images in one or more embodiments. In the embodiment of FIG. 2B, a storage device 212 is provided to record images captured by the imaging device 120 of the multipurpose trail camera. The storage device 212 may utilize various storage technologies, include optical, magnetic, or flash memory based storage technologies. Since the storage functionality is provided by a hardware module 108, a user may select his or her desired amount of storage for the multipurpose trail camera. In addition, various types of storage devices may be selected. For example, in more extreme or rugged environments non-mechanical storage devices 212, such as flash memory, may be selected. Alternatively, in situations where a large number of images are to be captured, mechanical storage (which typically offers increased storage capacity at lower cost) can be selected. In addition, certain environmental conditions, such as electrical or magnetic interference, heat, or cold may dictate which type of hardware module 108 is selected.

Figure 2C:
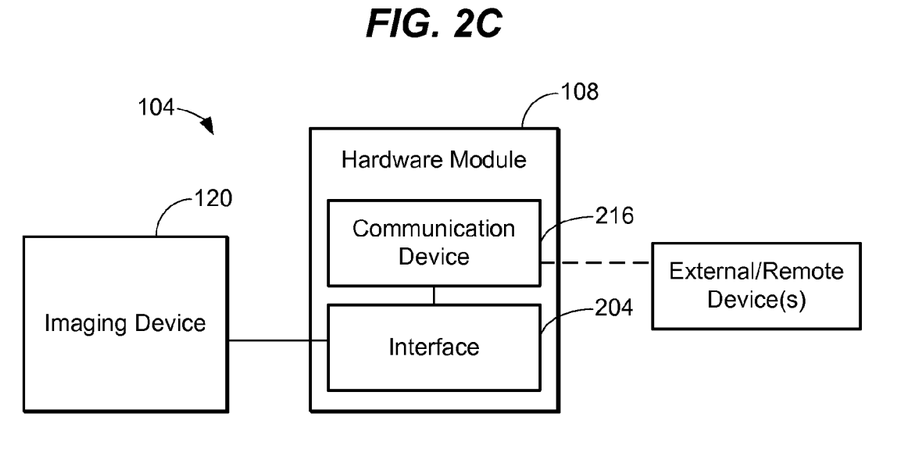
FIG. 2C is a block diagram illustrating an exemplary hardware module having a communication device.

The hardware module 108 of FIG. 2C illustrates additional hardware features that may be provided by a module. As can be seen, a hardware module 108 may include one or more communications devices 216 to allow for communication with external devices. A communication device 216 may utilize various communication protocols to allow communication across various local area networks, wide area networks (including the Internet), direct communication links (with one or more other devices), and other communication links/networks, such as through Wi-Fi or cellular data communications. Typically, wireless communication will be provided by a communication device 216. In some embodiments, a communication device may be configured through a wired communication link however. A communication device 216 may allow images to be transmitted from the multipurpose trail camera. In addition, a communication device 216 may allow various information about the multipurpose trail camera to be transmitted to the user. For example, diagnostic or other information may be transmitted. It is also contemplated that a communication device 216 may be used to communicate commands or instructions to the multipurpose trail camera thereby allowing the multipurpose trail camera to be remotely controlled and/or configured.

Figure 2D:
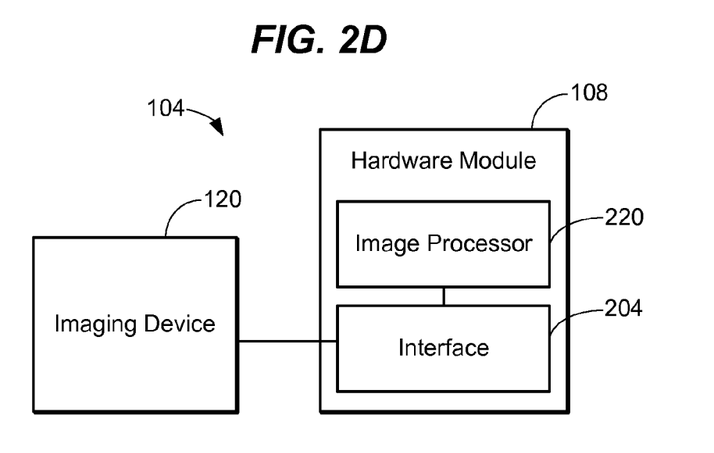
FIG. 2D is a block diagram illustrating an exemplary hardware module having an image processor.

The hardware module 108 of FIG. 2D illustrates yet additional features that may be provided by a module. In this hardware module 108 an image processor 220 is provided for processing images captured by the imaging device 120. For example, the image processor 220 may compress, enhance, or analyze images captured by the imaging device. It is contemplated that the resulting images or data may be stored and/or transmitted to the user. The image processor 220 may receive information from the imaging devices 120 components, such as a sensor and/or distance sensor when performing its compression, enhancement or analysis function. For example, different image enhancement techniques may be applied depending on the distance of the wildlife to be captured. In some embodiments, the multipurpose trail camera, such as at its imaging device, may comprise other sensors to determine light level and other environmental characteristics. The image processor 220 may utilize this information as well during its operation, such as to adjust image contrast, brightness, and color. In addition the image processor 220 may communicate with the imaging device 120 through an interface 204 to adjust exposure, shutter speed, focus, and other settings related to imaging/image capture.

Though disclosed above as providing individual hardware features, a hardware module 108 may provide multiple features in one or more embodiments. For instance, hardware features, such as a power source 208 and communication device 216 may be combined in one hardware module 108. As an alternate example, a communication device 216 and storage device 212 may be provided by a hardware module 108 (while power is provided by another hardware module).

Electrical power will typically be transmitted from a power source of a hardware module 108 to the imaging device 120 (and any other attached hardware modules). Communication signals may be transmitted between an imaging device 120 and one or more attached hardware modules 108 via their respective interfaces. In one or more embodiments, the imaging device 120 may comprise a controller to facilitate communication and power transmission. For example, the controller may orchestrate communication between these components.

During an image capture operation, a captured image may be transmitted from the imaging device 120, via its interface, to one or more hardware modules 108 for storage, transmission, and/or processing (depending on the type and configuration of the hardware modules that are attached).

It is contemplated that various hardware modules 108 may be configured to adjust or enhance the appearance of the multipurpose trail camera in one or more embodiments. For example, some hardware modules 108 may be used to camouflage the multipurpose trail camera by making it appear like a natural structure or formation. In such embodiments, multiple attachments 140 may be provided at various locations on the enclosure of the multipurpose trail camera to allow connection one or more of such hardware modules 108.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A multipurpose trail camera with interchangeable hardware modules comprising:
   an imaging device comprising a camera and one or more sensors configured to detect the presence of wildlife, wherein the image capture device is configured to capture one or more images of the wildlife when the wildlife is detected;
   a first enclosure configured to enclose and protect the imaging device, the first enclosure comprising:
      a front and a back, wherein one or more mounts for mounting the multipurpose trail camera are at the back;
      a channel at the front that extends around a periphery, the channel comprising a top portion that extends across a top of the first enclosure and two side portions that extend along both sides of the first enclosure, wherein the channel does not extend across a bottom of the first enclosure; and
      one or more first interfaces coupled to the imaging device;
   one or more hardware modules comprising a power source and one or more communication devices, the one or more communication devices configured to:
      receive the one or more images via the one or more first interfaces when the one or more hardware modules are attached to the imaging device; and
      wirelessly transmit the one or more images to one or more external devices using the one or more communication devices; and one or more second enclosures configured to enclose and protect the one or more hardware modules, the one or more second enclosures comprising:
  a flange around a periphery of the one or more second enclosures; and
  one or more second interfaces coupled to the one or more hardware modules and configured to engage the one or more first interfaces and permit transmission of power and the one or more images between the one or more hardware modules and the imaging device when the imaging device is connected to at least one of the one or more hardware modules;
  wherein the first enclosure and second enclosure are attached to one another by engaging the two side portions of the channel with the flange at the bottom of the first enclosure and sliding the second enclosure until the flange is engaged within the top portion of the channel;
  wherein the first enclosure and second enclosure are removed by sliding the flange to disengage the top portion of the channel until the flange exits the two side portions of the channel.

2. The multipurpose trail camera of claim 1, wherein the one or more hardware modules comprise a storage device for storing the one or more images.

3. The multipurpose trail camera of claim 2, wherein the one or more hardware modules comprise an image processor configured to compress the one or more images before they are stored on the storage device.

4. The multipurpose trail camera of claim 1, wherein the one or more hardware modules comprise an image processor, and the image processor compresses the one or more images before they are wirelessly transmitted to the one or more external devices.

5. The multipurpose trail camera of claim 1, wherein the first enclosure and the one or more second enclosures are sealed to prevent moisture from entering and damaging the imaging device and the one or more hardware modules.

6. The multipurpose trail camera of claim 1, wherein the one or more communication devices are configured to transmit the one or more images to the one or more external devices via a Wi-Fi, Bluetooth, or cellular data connection.

7. The multipurpose trail camera of claim 1, wherein the first enclosure includes one or more illuminators that illuminate when the camera is capturing an image.

8. A multipurpose trail camera with interchangeable hardware modules comprising:
  an imaging device comprising:
    a camera configured to capture one or more images of wildlife;
    one or more sensors configured to detect the presence of wildlife, wherein the camera is activated to capture the one or more images when wildlife is detected;
    one or more first interfaces for communicating the one or more images;
    a first enclosure configured to hold and protect the camera, one or more sensors, and one or more first interfaces therein, wherein at least a portion of the one or more first interfaces is externally accessible at an exterior of the first enclosure; and
    a channel at one side of the first enclosure, the channel comprising a top portion that extends across a top of the first enclosure and two side portions that extend along both sides of the first enclosure, wherein the channel does not extend across a bottom of the first enclosure; and
  a plurality of hardware modules configured to removably attach to the imaging device, each of the plurality of hardware modules comprising:
    a power source configured to provide electrical power to the imaging device;
    a second interface configured to engage the first interface of the imaging device, wherein the hardware module receives the one or more images via the second interface;
    an image processor configured to compress the one or more images received via the second interface to generate one or more compressed images;
    a storage device configured to store the one or more compressed images;
    a second enclosure configured to hold and protect the power source, second interface, and wireless communication device therein, wherein at least a portion of the second interface is externally accessible and positioned to engage the first interface of the imaging device when the imaging device is attached to the hardware module; and
    a flange extending around a periphery of the second enclosure;
  wherein only a subset of the plurality of hardware modules also comprises a wireless communication device configured to transmit the one or more compressed images to one or more remote devices.

9. The multipurpose trail camera of claim 8, wherein the image processor is configured to adjust the contrast, brightness, or color of the one or more images before the one or more images are transmitted to the one or more remote devices.

10. The multipurpose trail camera of claim 8, wherein the image processor is configured to control an exposure setting of the camera by communicating through the coupling of the first interface and the second interface when any one of the plurality of imaging devices is attached to the hardware module.

11. The multipurpose trail camera of claim 8, wherein the wireless communication device transmits the one or more images to the one or more remote devices via a local area network, a wide area network, or the Internet.

12. The multipurpose trail camera of claim 8, wherein the power source comprises a connection for connecting the power source to an electrical utility to receive electrical power therefrom.

13. The multipurpose trail camera of claim 8, wherein the second enclosure comprises one or more mounts for securing the second enclosure to an outdoor structure.

14. The method of claim 13 further providing an image processor in the first and second hardware modules, wherein the image processor compresses the one or more images before they are stored or transmitted to the one or more remote devices.

15. The method of claim 14, wherein the image processor alters the brightness, contrast, or color of the one or more images before they are stored or transmitted to the one or more remote devices.

16. The method of claim 13 further comprising configuring the communication device to transmit the one or more images wirelessly to the one or more remote devices.

17. The multipurpose trail camera of claim 8, wherein the first enclosure includes one or more illuminators that illuminate when the camera is capturing an image.

18. A method for providing a multipurpose trail camera comprising:

providing an imaging device comprising a camera and one or more sensors, wherein the camera is configured to capture one or more images when the one or more sensors detect the presence of wildlife;

providing a flange that extends around a periphery of the imaging device;

providing a first hardware module for attachment to an outdoor structure, the hardware module comprising an interface for receiving the one or more images from the imaging device, a wireless communication device, and a storage device for storing the one or more images, the interface, the storage device and the communication device contained within a first enclosure;

providing a channel at a first side of the first enclosure, the channel comprising a top portion that extends across a top of the first enclosure and two side portions that extend along both sides of the first enclosure, wherein the channel does not extend across a bottom of the first enclosure;

attaching the imaging device to the first enclosure by sliding the flange within the two side portions of the channel until the flange is engaged within the top portion of the channel, wherein the first enclosure and second enclosure are removed by sliding the flange to disengage the top portion of the channel until the flange exits the two side portions of the channel;

wherein when attached to the first hardware module, the one or more images from the imaging device are stored by the first hardware module and wirelessly transmitted to the one or more remote devices by the wireless communication device.

19. The method of claim 18 further comprising attaching one or more illuminators to the imaging device, wherein the one or more illuminators illuminate when the camera is capturing an image.

* * * * *